United States Patent [19]
Fujii et al.

[11] 3,957,680
[45] May 18, 1976

[54] PROCESS FOR THE PREPARATION OF SURFACE ACTIVE AGENTS

[75] Inventors: Fumio Fujii; Koji Kurahara; Akitoshi Igata; Toshihiro Koga, all of Omuta Fukuoka, all of Japan

[73] Assignee: Mitsui Toatsu Chemicals, Incorporated, Tokyo, Japan

[22] Filed: Aug. 19, 1974

[21] Appl. No.: 498,718

[52] U.S. Cl. ............................... 252/353; 260/49; 8/89 A
[51] Int. Cl.$^2$ .................. C08G 14/12; B01F 17/52; C09B 67/00; D06P 1/56
[58] Field of Search ............... 252/353; 260/505 C, 260/505 S, 512 C, 49; 8/89, 94.24

[56] References Cited
FOREIGN PATENTS OR APPLICATIONS
342,253  6/1972  U.S.S.R.

OTHER PUBLICATIONS
Kirk–Othmer; *Encyclopedia of Chemical Technology*, Vol. 13, pp. 593–596, Interscience Encyclopedia Inc (1954).

*Encyclopedia of Polymer Science and Technology*, Vol. 7, p. 704, John Wiley & Sons Inc. (1967).

*Primary Examiner*—Benjamin R. Padgett
*Assistant Examiner*—David Leland
*Attorney, Agent, or Firm*—Fisher, Christen & Sabol

[57] ABSTRACT

Surface active agents are obtained by reacting, in water as solvent and under normal pressure, cresol, formaldehyde, sodium sulfite, and 2-hydroxynaphthalene. The surface active agents exhibit excellent high dispersing power upon finely grinding with disperse dyes and in use at high temperatures whereby they are effective in giving level dyeing to polyester fibers in high temperature dyeing processes and give little or no cellulose staining in dyeing a polyester/cellulose blended yarn or fabric by the thermosol process.

7 Claims, No Drawings

PROCESS FOR THE PREPARATION OF SURFACE ACTIVE AGENTS

BACKGROUND OF THE INVENTION

1. Field of the Invention

The present invention relates to a process for the preparation of surface active agents for use in disperse dyes and, more particularly, to a process for the preparation of such surface active agents which exhibit excellent dispersing power in high temperature dyeing with water-insoluble disperse dyes for synthetic fibers, as well as little or no cellulose staining in dyeing a synthetic fiber/cellulosic fiber blended yarn fabric by the thermosol process.

The term "disperse dyes" is used herein to indicate water-insoluble disperse dyes for use in dyeing synthetic fibers and disperse dyes of the azoic type.

2. Description of the Prior Art

In the field of dyeing of polyester fibers there is most commonly used, in general, a high temperature dyeing process wherein the fibers are dyed with a water-insoluble disperse dye under pressure at elevated temperatures.

Recently, with the increasing production of polyester textured yarn, instances wherein a textured yarn is the substrate to be dyed have been increasing, and this has given rise to many dyeing problems, all resulting from the properties of the textured yarn. Of these problems, the problem of level dyeing if of particular importance. In general, when a textured yarn is subjected to high temperature dyeing with a water-insoluble disperse dye, an unsatisfactory dyeing level is often obtained. In order to improve the dyeing level performance, surface active agents, called levelling agents, are often added during dyeing. These levelling agents consist usually of nonionic or anionic surface active agents and are used in such great amounts that although, through the use of these agents, the dyeing level effect on polyester textured yarns or fabrics made therefrom is satisfactorily performed, the dispersed condition of the finely granulated dye tends to be destroyed in the course of the dyeing procedure, resulting in aggregation of the finely granulated dye which in turn causes many problems. In addition, the levelling agents, having a retarding action, often reduce the dyeing depth of the substrate.

As a surface active agent having dispersing power at high temperatures there has previously been used the surface active agent described in PB Report 101462 which is obtained by reacting, in water as solvent and under pressure, cresol, formalin, sodium sulfite, the sodium salt of Schäffer's acid (2-hydroxynaphthalene-6-sulfonic acid) and sodium hydroxide. This surface active agent, when used in finely granulating a dye, exhibits good dispersing power under alkaline conditions but remarkably reduced dispersing power under acidic or neutral conditions. Furthermore, when used in high temperature dyeing in the presence of a levelling agent, it shows inadequate dispersing power at high temperatures. In addition, its production process is a reaction under pressure, so that the operation is extremely intricate.

SUMMARY OF THE INVENTION

It is therefore a primary object of the present invention to provide surface active agents which overcome the above-described deficiencies of the prior art and to provide a process for the preparation of such surface active agents.

It is another object of the present invention to provide such a process wherein the resulting surface active agents exhibit excellent dispersing power at high temperatures and, when used in combination with a levelling agent, cause no aggregation of finely granulated dyes and give rise to little or no cellulose staining when dyeing a polyester/cellulose blended yarn or fabric by the thermosol process.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description. It has been found that the above objects can be attained by practicing the present invention.

With a view to improving the properties of the surface active agents of prior art, as well as their production process, we have discovered that by employing 2-hydroxynaphthalene instead of the sodium salt of Schäffer's acid there are obtainable, by reaction under normal pressure, surface active agents which, when used with water-insoluble disperse dyes, exhibit excellent dispersing power when finely granulating the dyes, not only under alkaline conditions but also under acidic or neutral conditions. Furthermore, their dispersing power is high also at high temperatures, so that they are effective in giving level dyeing to polyester fibers in high temperature dyeing processes. In addition, when dyeing a polyester/cellulose blended yarn or fabric by the thermosol process, there is little or no cellulose staining.

DESCRIPTION OF THE PREFERRED EMBODIMENTS

Examples of suitable cresols for use in the present invention include m-cresol, synthetic m-cresol and fractionated cresol. The term "synthetic m-cresol" is used herein to define a mixture having as predominant ingredients m-cresol, o-cresol and p-cresol, wherein the m-cresol content is not lower than 55%. The composition of commercially available synthetic m-cresol is in the range of m- : p- : o-isomer = 55–62 : 45–38 : 0.1–0.3. The term "fractionated cresol" is used herein to define a mixture of phenol, o-cresol, m-cresol, p-cresol and xylenol, wherein the phenol content is not higher than 40% and the m-cresol content not lower than 20%. The composition of commercially available fractionated cresol is in the range of phenol : o-cresol : m-cresol : p-cresol : xylenol = 25–36 : 10–14 : 20–24 : 10–16 : 14–18.

When, as the starting cresol material, p-cresol is used alone, it is difficult to obtain satisfactory surface active agents. On the other hand, the use of o-cresol, phenol or xylenols affords relatively satisfactory surface active agents which are, however, inferior to those obtained from m-cresol. Accordingly, as the cresol used in the present invention, a cresol consisting predominantly of m-cresol and containing o- and/or p-isomer and/or phenol and/or xylenols, is preferred.

The formaldehyde used in the present invention is usually used in the form of an aqueous formaldehyde solution containing, for example, from 30 to 50 % by weight formaldehyde, e.g., commercially available formalin, although paraformaldehyde may be used.

In the following description as to the relationship between the quantities of starting materials used in the reaction of the present invention, the quantity of cresol on which calculation is based includes also any phenol and/or xylenol contents in the cresol, phenol and xylenols being considered as cresol.

In the present invention, formaldehyde is preferably used in the proportion of 1 to 4 mols per mol cresol, sodium sulfite in the proportion of 0.4 to 1.5 mols per mole cresol and 2-hydroxynaphthalene in the proportion of 5 to 30 parts by weight per 100 parts by weight cresol. More preferably, the formaldehyde to cresol mol ratio is 1.5–2.5 : 1, the sodium sulfite to cresol mol ratio is 0.5–1.0 : 1, and the 2-hydroxynaphthalene to cresol ratio by weight is 8–20 : 100.

When the amount of formaldehyde per mol of cresol is lower than 1 mol, the reaction tends not to proceed smoothly and the amount of unreacted cresol is increased. On the other hand, when the amount exceeds 4 mols, the condensation reaction degree becomes too high and solidification takes place in the course of the reaction, which results in reduction of dispersing power and an increase of tendency to cellulose staining. When the amount of sodium sulfite, per mol of cresol, is lower than 0.4 mol, the hydrophobicity is increased, resulting in an increase of tendency to cellulose staining. On the other hand, when it exceeds 1.5 mols, the hydrophilicity becomes too high, resulting in reduction of dispersing power. When the amount of 2-hydroxynaphthalene, per 100 parts by weight of cresol, is lower than 5 parts by weight, the tendency to aggregation of the dye in high temperature dyeing and to cellulose staining is adversely affected. On the other hand, when it exceeds 30 parts by weight, the adverse affect upon the tendency to aggregation of the dye in high temperature dyeing will appear again.

In the present invention the reaction of cresol, formaldehyde, sodium sulfite and 2-hydroxynaphthalene is carried out using water as solvent, and the amount of water including, when using the formaldehyde in the form of formalin, the amount of water contained therein, is preferably in the range of from 280 to 500 parts by weight per 100 parts by weight of the cresol. When the amount of water is less than 280 parts by weight, solidification of the reaction mixture tends to take place in the course of the reaction and the use of such smaller amounts of water is therefore not preferred. On the other hand, when the amount exceeds 500 parts by weight, proceeding of the reaction is slowed and the use of such higher amounts of water is also therefore not preferred.

Since the rate of condensation reaction varies with the kind of the cresol used as the starting material, the reaction temperature and reaction time are not closely defined, although the reaction temperature is preferably in the range of from 60°C. to the boiling point of the reaction system and the reaction time is preferably in the range of from 3 to 50 hours.

In practicing the present invention, it is preferred to first add cresol, sodium sulfite and 2-hydroxynaphthalene to the water solvent and then add the formaldehyde. When the order of addition is reversed, surface active agents of high quality which are the object of the present invention can be obtained only with difficulty. Thus, for example, when cresol, 2-hydroxynaphthalene and formaldehyde are added first to the water followed by addition of sodium sulfite, the condensation reaction between cresol or 2-hydroxynaphthalene and formaldehyde takes place preferentially which results in the formation of a resinous product and the reaction of sodium sulfite to introduce hydrophilic groups does not proceed smoothly.

The formaldehyde is preferably added in portions, with stirring, in the form of formalin. When it is added all at one time, the reaction proceeds rapidly, generating a great amount of exothermic heat, which not only decreases the operation efficiency, but also adversely affects the quality of the resultant surface active agent. From the standpoint of operational efficiency and quality of the product, it is most preferable to maintain the reaction system at a temperature not higher than 50°C. until the end of the addition of formaldehyde, and to thereafter raise the reaction temperature to a given point within the above described range to continue the reaction further.

The reaction of cresol, 2-hydroxynaphthalene, formaldehyde and sodium sulfite utilized in the present invention, is a condensation reaction, but the mechanism of the reaction is intricate and the surface active agent obtained as the condensation reaction product is considered to be a mixture of varied compounds of different structures. Thus it is considered that the formaldehyde partakes in the reaction to form methylene cross-linkages between cresol molecules and between cresol and 2-hydroxynaphthalene, and, at the same time, reacts with sodium sulfite to form the —CH$_2$SO$_3$Na group which is presumed to be attached to the cresol and 2-hydroxynaphthalene in a nuclear-substituting form, thus inhibiting the otherwise possible three-dimensional resinification reaction.

An example of the structure of the surface active agent obtained in accordance with the invention, using m-cresol as the cresol, is shown in the following formula:

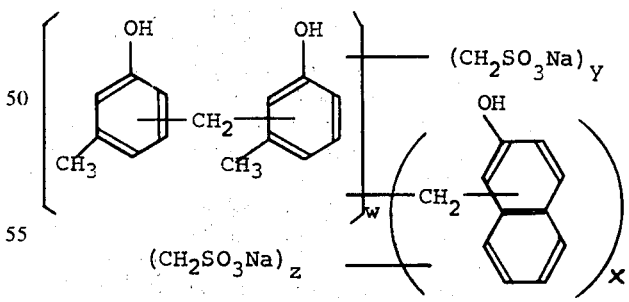

wherein $w$, $x$, $y$ and $z$ are any integers.

When synthetic m-cresol is used as the cresol in the present invention, an example of the structure of the resultant surface active agent will be shown by a formula which is the same as the above formula except that the m-cresol portions therein are partly substituted by p- or o-cresol. Likewise, when fractionated cresol is used as the cresol, the structure of the resultant surface active agent will be shown by a formula which is the same as the above formula except that the cresol portions in the formula are partly further substituted by phenol or xylenols.

In actually applying the surface active agents of the present invention, the reaction mixture is usually used as such as the dispersing agent for dyes or the like although, if necessary, it may be used as a solid after drying, for example, by spray drying.

The surface active agents obtained in accordance with the present invention, when used with water-insoluble disperse dyes, exhibit excellent dispersing power when finely granulating (grinding) the dyes not only under alkaline conditions but also under acidic or neutral conditions. Furthermore, their dispersing power is high also at high temperatures, so that they are effective in giving level dyeing to polyester fibers in high temperature dyeing processes. In addition, in dyeing a polyester/cellulose blended yarn or fabric by the thermosol process there is little or no cellulose staining.

In addition to the advantageous properties of the surface active agents obtained, the present invention affords significant advantages in operation conditions. For example, the process described in PB Report 101462 is a reaction under pressure and thus requires the use of a pressurized reaction vessel, whereas the present invention, by employing 2-hydroxynaphthalene instead of the sodium salt of Schäffer's acid, has made it possible to prepare excellent surface active agents under normal pressure. Those surface active agents obtained through reaction with the sodium salt of Schäffer's acid under normal pressure exhibit, in the presence of a levelling agent, poor dispersing power at high temperatures, and thus in high temperature dyeing, aggregation of finely granulated dye takes place and level dyeing is not attainable. Furthermore, while in the process as described in the PB Report, the condensation reaction is conducted in two stages, the process of the present invention can be carried out in a single stage.

As can be seen from the foregoing, the present invention provides significant advantages in the quality of the resultant surface active agents as well as in production costs and operation.

The present invention will be described in more detail by the following illustrative examples, wherein parts and percentages are all by weight unless otherwise indicated.

EXAMPLE 1

90 parts of sodium sulfite was added to 265 parts of water and heated to solution. 100 parts of synthetic m-cresol (o-cresol : m-cresol : p-cresol = 0.3 : 60 : 38) and 15 parts of 2-hydroxynaphthalene were dissolved in the solution at 50°C. and 158 parts of 37% aqueous formaldehyde solution then added dropwise in portions. The mixture was raised to a temperature of from 98° to 100°C. and maintained at this temperature for 14 hours. After the reaction was complete, the reaction mixture was cooled down to room temperature to obtain an aqueous solution of the surface active agent.

19 parts (as solids content; the term solids content defining the components other than water) of this surface active agent was mixed well with 10 parts of a dye (C. I. Disperse Red 56), finely ground in the usual manner and dried. The resultant dye composition is referred to as Sample No. 1.

A second surface active agent was prepared in the same manner as described above except that the 2-hydroxynaphthalene was not added as a starting material, and using the resultant agent, the same fine grinding and drying teatments as in the preparation of Sample No. 1 were effected. The resultant dye composition is referred to as Sample No. 2.

A third surface active agent was prepared in accordance with the manner described in PB Report 101462 : 1,060 Kg of cresol, 1,125 Kg of 30% aqueous formaldehyde solution (cresol to formaldehyde mol ratio = 1 : 1.13), 1,040 Kg of sodium sulfite (crystalline; cresol to sodium sulfite mol ratio = 1 : 0.84) and 1,040 Kg of water were placed in an autoclave, raised to a temperature of 125°C., maintained at this temperature and under a pressure of 1.6 to 2 atmospheres for 1.5 to 2 hours and cooled (in this stage a sulfonated cresol bakelite was formed). To the reaction mixture were added 200 Kg (calculation based on fineness) of a paste of the sodium salt of Schäffer's acid and 148 Kg of 40°Be caustic soda, and the mixture heated at 110° to 115°C. and under a pressure of 1.3 to 1.5 atmospheres for 2 hours to obtain a surface active agent. Using this surface active agent, the same fine grinding and drying treatments as in the preparation of Sample No. 1 were effected to obtain a dye composition referred to as Sample No. 3.

The following Table 1 shows the results obtained with the respective samples as to aggregation of dye in high temperature dyeing and staining on cottom with the thermosol process.

Table 1

| Sample No. | Aggregation of dye in high temperature dyeing 1) | | Staining on cotton with thermosol process 2) | |
|---|---|---|---|---|
| | A | B | C | D |
| 1 | 5 | 3 | 3–4 | 2–3 |
| 2 | 1 | 2 | 1 | 1–2 |
| 3 | 3 | 1 | 3 | 2 |

Remarks
1. The evaluations were made in accordance with the Dye-o-Meter test [Seni, 22, 426 (1970)]. A dye dispersion having the following composition:
   Any one of Samples 1–3          2 parts
   Sunsalt 1200 (a nonionic surface active agent, manufactured by Nikka Kagaku Co., Ltd.)          1 part
   Water          1000 parts
was prepared. 7 parts of a Tetron top (polyester, manufactured by Toray Co., Ltd.) was treated in a Dye-o-Meter (manufactured by Toyo Rika Kogyo Co., Ltd.) with 300 parts of the resultant dye dispersion using the following temperature programs.

Process A: The temperature of the dye bath was gradually raised from 40°C. to 130°C. over a time period of 22.5 minutes. Immediately thereafter, the pump circulating the dye dispersion was stopped, and after cooling, the substrate was removed. By this process, aggregation of dye during the temperature rise could be evaluated.

Process B: The temperature of the dyebath was gradually raised from 40°C. to 130°C. over a time period of 22.5 minutes, maintained at 130°C. for 10 minutes and then cooled. The pump circulating the dye dispersion was not stopped until the end of the treatment, and after cooling the substrate was removed. By this process an integrated result of aggregation over the entire dyeing process could be evaluated.

The evaluations were made visually by rating the aggregates deposited on the Tetron top using the following five point scale:

| | |
|---|---|
| 5 | Excellent |
| 4 | Very good |
| 3 | Good |
| 2 | Moderate |
| 1 | Poor |

In addition, a rating of, for example, "2-3" indicates an intermediate degree between 2 and 3.

2. Staining on cotton with the thermosol process was evaluated by the following test method Process C: 30 parts of the dye composition and 2 parts of sodium alginate were dispersed and dissolved in 1,000 parts of water and a cotton cloth (60's broadcloth) was padded with the resultant dye dispersion (pick-up 65%), intermediately dried, heat treated at 200°C. for 60 seconds and then subjected to conventional reduction clearing followed by final drying. The degree of staining on the cotton cloth was compared with an undyed cloth for staining and the evaluation was made using a grey scale for staining [JIS-L-0805 (1965)].

Process D: Subseqent to the 200°C./60 second heat treatment described in Process C, chemical padding and steaming were applied in accordance with the continuous dyeing method conventional in vat dye application. Conventional soaping was then applied. After drying, the degree of staining on the cotton cloth was compared with an undyed cloth and the evaluation was made using a grey scale for staining.

As can be fom Table 1, with Sample No. 1 the aggregation of dye in high temperature dyeing was more satisfactory than in Sample Nos. 2 and 3 and the staining on cotton with the thermosol process was also lower.

EXAMPLE 2

90 parts of sodium sulfite, 265 parts of water and 12.5 parts of 2-hydroyxnaphthalene were added to 100 parts of fractionated cresol having a composition in mol ratio of phenol : cresol : xylenols = 36 : 50 : 14. To the mixture was added with stirring 160 parts of 37% aqueous formaldehyde solution dropwise in portions at 50°C. The mixture was maintained at 98° to 100°C. for 20 hours. After the reaction was complete the reaction mixture was cooled down to room temperature to obtain an aqueous solution of a surface active agent.

26 parts (solids content) of this surface active agent was thoroughly mixed with 10 parts of a dye (C. I. Disperse Orange 49) and the mixture was finely ground in the conventional manner. The resultant dye composition is referred to as Sample No. 4.

A second surface active 0gent was prepared in the same manner except that the 2-hydroxynaphthalene was not added as a starting material, and using this agent, the same fine grinding and drying treatments as in the preparation of Sample No. 4 were effected. The resultant dye composition is referred to as Sample No. 5.

Using the surface active agent prepared in accordance with the process of PB Report 101462 described in Example 1, the same fine grinding and drying treatments as in the preparation of Sample No. 4 were effected. The resultant dye composition is referred to as Sample No. 6.

The results of tests conducted in the same manner as in Example 1 are set forth in Table 2.

Table 2

| Sample No. | Aggregation of dye in high temperature dyeing 1) | | Staining on cotton with thermosol process 2) | |
|---|---|---|---|---|
| | A | B | C | D |
| 4 | 4 | 4 | 3 | 1-2 |
| 5 | 3 | 1 | 2-3 | 1 |
| 6 | 2 | | 2-3 | 1 |

As can be seen from Table 2, both the aggregation of dye in high temperature dyeing and staining on cotton with the thermosol process in Sample No. 4 are superior to those in Sample Nos. 5 and 6.

EXAMPLE 3

57 parts of sodium sulfite was dissolved in 187 parts of water, to which solution were added at 50°C. 80 parts of m-cresol (purity not lower than 98%) and 20 parts of 2-hydroxynaphthalene. To the mixture was then added dropwise 110 parts of 37% aqueous formaldehyde solution. The temperature was raised to 98° to 100°C., and maintained for 10 hours. After cooling, 60 parts (solids content) of the resultant surface active agent was thoroughly mixed with 40 parts of a dye (C. I. Disperse Orange 13), finely ground and dried in the conventional manner. The resultant dye composition is referred to as Sample No. 7.

A second surface active agent was prepared in the same manner except that the 2-hydroxynaphthalene was not added as a starting material, and using this agent, the same fine grinding and drying treatments as in the preparation of Sample No. 7 were effected. The resultant dye composition is referred to as Sample No. 8.

Using the surface active agent prepared in accordance with the process of PB Report 101462 described in Example 1, the same fine grinding and drying treatments as in the preparation of Sample No. 7 were effected. The resultant dye composition is referred to as Sample No. 9.

The results of tests conducted in the same manner as in Example 1 set forth in Table 3.

Table 3

| Sample No. | Aggregation of dye in high temperature dyeing | | Staining on cotton with thermosol process | |
|---|---|---|---|---|
| | A | B | C | D |
| 7 | 5 | 4 | 3 | 2-3 |
| 8 | 3 | 2 | 2 | 1-2 |
| 9 | 3 | 2 | 2 | 1-2 |

As can be seen from Table 3, both the aggregation of dye in high temperature dyeing and staining on cotton with the thermosol process in Sample No. 7 are superior to those in Sample Nos. 8 and 9.

The PB Report 101462 referred to hereinabove is Hochst process dated 13 August 1934, located in 7th Army Document Center at Heidelberg, and the teaching is as follows:

I. Materials:
   1060 Kg Cresol
   1125 Kg Formaldehyde
   1040 Kg Sodium sulfite crystals
   1040 Kg Water
   148 Kg NaOH 40°Be
   200 Kg Schaeffer's Salt 100% as paste.

II. Procedure:

Formaldehyde is condensed with cresol under pressure in the presence of sodium sulfite (therefore weakly alkaline), yielding a sulfonated cresol Bakelite. This is finally condensed under pressure with Schaeffer's Salt after addition of caustic soda. In the first phase, it is heated in a closed kettle to about 95°C., the reaction raises the temperature to about 125°C., resulting in a pressure of 1.6 – 2 atm. It is held at this temperature for 1 – 1½ hours, then cooled slowly. Schaeffer's Salt, NaOH, a little sulfite and formaldehyde are added, and the mass heated to 110° – 115°C. (1.3 – 1.5 atm) and helt 2 hours. The finished product is concentrated to about 37%.

III. Apparatus:
   Iron kettle with condenser.

IV. Properties:
   Syrupy, brown, clear, alkaline liquid which darkens rapidly in the air.

V. Similar to Tamol and may be a superior substitute. Used at Hochst and Ludwigshafen almost exclusively for "Powder Fine" brands of dye powders.

What is claimed is:

1. A process for the preparation of a surface active agent which comprises first adding cresol, sodium sulfite and 2-hydroxynaphthalene to water as solvent, then adding formaldehyde to the resultant solution and reacting the mixture under normal pressure to obtain said surface active agent.

2. The process according to claim 1 wherein the formaldehyde is used in the proportion of 1.0 to 4.0 mols per mol cresol, the sodium sulfite is used in the proportion of 0.4 to 1.5 mols per mol cresol, the 2-hydroxynaphthalene is used in the proportion of 5 to 30 parts by weight per 100 parts by weight cresol and the water is used in the proportion of 280 to 500 parts by weight per 100 parts by weight cresol.

3. The process according to claim 1 wherein the formaldehyde is added in the form of formalin in portions with stirring, and wherein the reaction system is maintained at a temperature of not higher thant 50°C. until the end of the addition of the formaldehyde after which the reaction temperature is raised to within the range of 60°C. to the boiling point of the reaction system.

4. The process according to claim 1 wherein the cresol is a member selected from the group consisting of m-cresol, synthetic m-cresol, fractionated cresol and mixtures thereof.

5. The process according to claim 4 wherein the formaldehyde is used in the proportion of 1.0 to 4.0 mols per mol cresol, the sodium sulfite is used in the proportion of 0.4 to 1.5 mols per mol cresol, the 2-hydroxynaphthalene is used in the proportion of 5 to 30 parts by weight per 100 parts by weight cresol and the water is used in the proportion of 280 to 500 parts by weight per 100 parts by weight cresol.

6. The process according to claim 4 wherein the formaldehyde is added in the form of formalin in portions with stirring, and wherein the reaction system is maintained at a temperature of not higher than 50°C. until the end of the addition of formaldehyde after which the reaction temperature is raised to within the range of 60°C. to the boiling point of the reaction system.

7. A surface active agent prepared according to the process of claim 1.

* * * * *